May 31, 1927. 1,631,052
R. OERTEL
PROCESS FOR THE RECOVERY OF VOLATILE SOLVENTS
Filed June 8, 1926
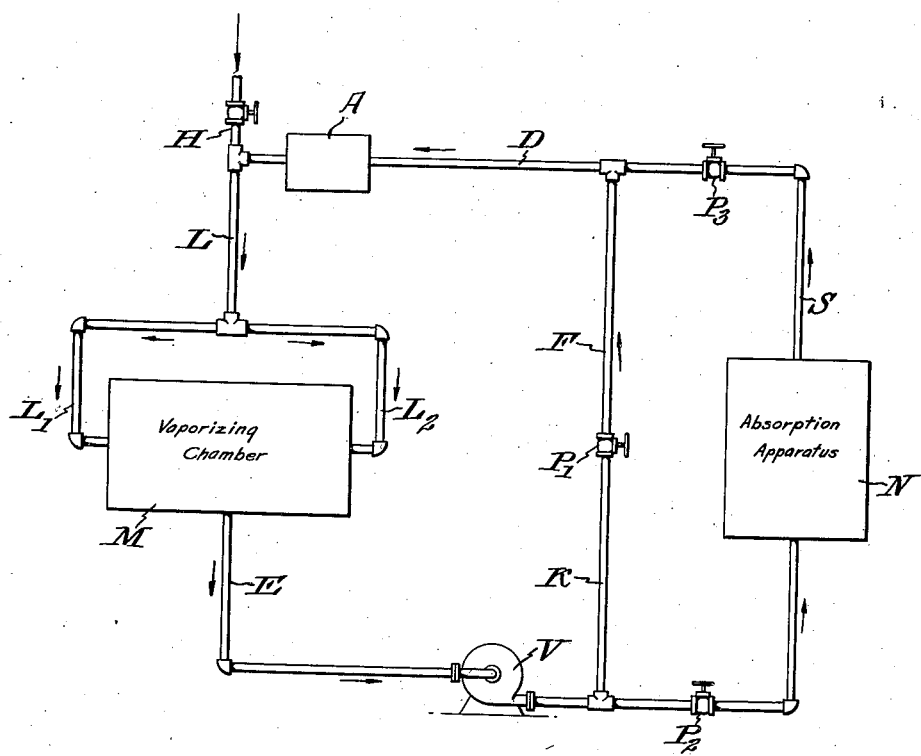
Inventor:
Rudolf Oertel
By Byrnes Townsend & Buckenstein
his Attorneys.

Patented May 31, 1927.

1,631,052

UNITED STATES PATENT OFFICE.

RUDOLF OERTEL, OF HANOVER, GERMANY, ASSIGNOR TO METALLBANK UND METALLURGISCHE GESELLSCHAFT AKTIENGESELLSCHAFT, OF FRANKFORT-ON-THE-MAIN, GERMANY.

PROCESS FOR THE RECOVERY OF VOLATILE SOLVENTS.

Application filed June 8, 1926, Serial No. 114,582, and in Germany April 7, 1924.

In various branches of industry, for example, in the production and preparation of rubber, artificial silk, synthetic bodies, smokeless powder and the like, many kinds of raw materials are dissolved in valuable solvents such as ether, acetone, benzene, alcohol, trichlorethylene, and the like.

As a subsequent step in the manufacturing processes, the materials are freed from the solvents by vaporizing the latter; the vapors being carried off by a current of air or other gases. The solvent may then be recovered from the mixture of solvent vapors and air or other gases by many different methods. Among the best known methods are (1) the freezing and compression processes in which the solvent-gas mixture is cooled below the dew point of the solvent, pressure being frequently employed in such processes; (2) washing processes, in which the solvent-gas mixture is scrubbed with a high boiling point fluid; and (3) absorption processes in which the solvent is stripped from the mixture by solid adsorbents, such as activated carbon, silica gel or alumina. These and similar methods are termed hereinafter "recovery processes".

The relative amount of solvent vapors in the gas or air stream is of great importance in the practical working of processes for recovering volatile solvents. It is a known fact that the operation of recovering the solvent is more favorable with increasing proportions of solvent in the current of mixed solvent vapors and gas or gases. With an ether content of 10 grams in 1 cubic meter of air, the percentage yield on recovery, under the same working conditions, is much less favorable than, for example, with a content of 50 grams per cubic centimeter. It may be stated that no recovery process can be carried out completely quantitatively, and the percentage losses are naturally the less the more grams of solvents are contained in one cubic meter of air. After recovery, if for example 0.5 grams remain in 1 cubic meter, this will be 5 percent in an original content of 10 grams per cubic meter, but only 1 percent (loss) with an original content of 50 grams per cubic meter. For a very dilute mixture, for example less than 10 grams solvent vapors in 1 cubic meter, the use of many of the recovery processes mentioned is unsuitable because the adsorptive power is not sufficient for the extraction from such a dilute mixture, or the loss of adsorptive agent, when a washing liquid with a relatively high vapor pressure, for example cresol, is involved, is very high and may make the method impractical. In the compression method the energy consumption in such case is disproportionately great.

The invention relates to such cases involving relatively dilute mixtures of solvents and air, and is intended to increase the solvent content to a degree compatible with manufacturing requirements and safety. In accordance therewith the current of air used for vaporizing the solvent is not, as hitherto, immediately passed to the adsorption reservoir or the condensation plant, but is used again after renewed heating, if desired, for vaporizing or evaporating further quantities of solvent. The re-use of the air current after renewed heating may, in many cases, continue up to approximately the saturation pressure of the solvent adsorbed, provided that the lowest temperature resulting from the evaporation is attained without injurious condensation taking place.

This method of operation has great industrial advantages. As stated, the percentage loss is always less in proportion as the solvent in the air current is enriched. By enriching the air in the described manner with a solvent content, for example of 50 grams per cubic meter, only one-fifth of the quantity of air need be passed through the recovery plant as compared with a content of 10 grams per cubic meter. The recovery plant may thus be suitably reduced in dimension and simplified by this enrichment. In addition there is a considerable saving in the power required for operating the plant. For the extraction, with immediate passage through the adsorption container or other recovery apparatus, it is necessary to have a high pressure blower with relatively high consumption of power, but for recirculating the lean solvent-gas mixture, after re-heating, use may be made of fans consuming but very little power, by reason of the slight counter-pressure.

According to the invention the drying air, theoretically, may be enriched with solvent vapors up to saturation. In practice, however, it is frequently the case that other limits must be considered, for with explodable carbons an increase in the solvent content may render the mixture explosive before the air stream is enriched to the point of saturation.

To reduce or to preclude the possibility of explosions, an important feature of the invention consists in raising the lower explosion limit of the current of solvent vapors and air or gas. When air is used as the carrier for alcohol vapors, the range in alcohol content within which explosions may occur is approximately from 5 to 13 percent by volume, corresponding respectively to about 100 to 250 grams of alcohol per cubic meter; and for mixtures of ether and air the limits are about 2.9 to 7.5 percent by volume or from 90 grams to 233 grams per cubic meter. To permit the use, with safety from explosion, of relatively high concentrations of solvent vapors, I raise the lower explosion limit by employing a medium of low oxygen content as the gaseous carrier for the vapors, which medium may be provided by adding nitrogen to air in the desired proportion.

Another method of preventing explosions in the recovery portion of the plant consists in increasing the concentration of the solvent, before passing the gas stream to the recovery apparatus, to such a degree that the upper explosion limit is exceeded. By recirculating the gaseous medium through the vaporizing apparatus until the upper explosion limit is passed, the possibility of explosion in the recovery apparatus is replaced by the possibility of explosion in the vaporizing apparatus. The net result is advantageous, however, since the probability of explosions in the vaporizing apparatus is materially less than in the recovery apparatus, where, for example, explosions may be started by the catalytic action of the adsorbent.

With the advantage of increasing the lower explosion limit by reducing the percentage of the constituents causing explosions in the gas or air current effecting vaporization, the further advantage is obtained that through suitable selection of the composition of the gas or air current the specific heat thereof is increased. The gas or air current is often at the same time the heat vehicle necessary for evaporating the solvent.

If, for example, air is cooled from 50° C. to 30° C., the quantity of heat given off is not nearly sufficient to vaporize the quantity of alcohol or even ether which may be contained in the chamber corresponding to a vapor pressure at 30°. An increase in the specific heat of the gaseous carrier is of great practical value. This may be accomplished, for example, by adding carbon dioxide to air since the specific heat of the air is 0.260 for 1 cubic meter and that of carbon dioxide 0.380.

A preferred arrangement of apparatus adaptable for the carrying out of the present invention will now be described in connection with the accompanying diagrammatic drawing.

The apparatus consists essentially of a drying or vaporizing chamber M, an absorber N, a blower V, a heating means A, and suitable conduits L, $L_1$, $L_2$, E, K, F, D and S furnished with valves $P_1$, $P_2$, and $P_3$ connecting said vaporizing chamber, blower, heating means and absorber in a closed system.

In operation, the gaseous medium is led into the vaporizing apparatus M through conduits L, $L_1$ and $L_2$, and is contacted with the material and solvent therein. The gaseous mixture of solvent vapor and medium is drawn from the vaporizing apparatus M through the conduit E into and through the blower V. The valve $P_1$ being open and valves $P_2$, $P_3$ and H being closed, the gaseous mixture is passed through the conduits K, F and D, the heating means A and conduit L, and into the vaporizing apparatus M where the solvent vapor content of the gaseous mixture is augmented. It will of course be obvious that heating means A may be omitted and any suitable heating elements (not shown) may be positioned within or about the conduits E, F, F and D, for the purpose of increasing the temperature of the gaseous mixture.

In the manner above described the gaseous medium is contacted with the solvent, heated, and re-contacted with the solvent until a suitably high concentration of solvent vapor in the gaseous mixture has been attained.

When the content of solvent vapor in the gaseous mixture has attained a desirable proximity to complete saturation, the valve $P_1$ is closed, the valves $P_2$ and $P_3$ are opened, and the gaseous mixture is passed through the absorption apparatus N, where the volatile solvent is separated from the gaseous medium and removed by suitable means (not shown). The gaseous medium, freed from solvent, passes through conduit S, valve $P_3$, into and through the conduit D, where it may be heated if desired, and through conduits L, $L_1$ and $L_2$ into the vaporizing chamber M for re-use.

To offset unavoidable losses of gaseous medium and/or to vary the composition thereof, additions to the gaseous medium may be effected through the conduit H from a suitable source. Thus there may be introduced air, nitrogen, carbon dioxide or other suitable gaseous medium into the cycle. That is, the composition of the gaseous medium may be altered so that its oxygen content is inferior to that of air, thereby permitting the safe enrichment of the solvent vapor-medium mixture without exceeding the explosive limits thereof. By the proper choice of components there may be obtained a gaseous medium either containing oxygen in proportion inferior to that of air, or containing inert gases to the virtual exclusion of air, adapted to effect specific results.

I claim:

1. Process for recovering volatile solvents which comprises repeatedly contacting a body of gas with a source of solvent vapors and subsequently subjecting the resulting gas-solvent vapor mixture to a solvent vapor absorption operation.

2. Process for recovering volatile solvents which comprises repeatedly contacting a body of gas with a source of solvent vapors, increasng the temperature of the gas by increments between successive contacts, and subsequently subjecting the resulting gas-solvent vapor mixture to a solvent vapor absorption operation.

3. Process for recovering volatile solvents which comprises repeatedly contacting a body of oxygen-containing gas with a source of solvent vapors until the upper explosion limit of the resulting gas-solvent vapor mixture has been exceeded, and subsequently subjecting the said resulting gas-solvent vapor mixture to a solvent vapor absorption operation.

4. Process for recovering volatile solvents which comprises repeatedly contacting a body of permanent gas having a higher specific heat than that of air with a source of solvent vapors and subsequently subjecting the resulting gas-solvent vapor mixture to a solvent vapor absorption operation.

5. Process for recovering volatile solvents which comprises repeatedly contacting a body of permanent gas having an oxygen content less than that of air with a source of solvent vapors and subsequently subjecting the resulting gas-solvent vapor mixture to a solvent vapor absorption operation.

6. Process for recovering volatile solvents which comprises contacting a body of oxygen-containing permanent gas having a higher specific heat than that of air with a source of solvent vapors, thereafter increasing the temperature of the resulting body of gas-solvent vapor mixture by heating, repeating the contacting and heating operations with said body of gas-solvent vapor mixture until the upper explosion limit of the resulting gas-solvent vapor mixture has been exceeded, and subsequently subjecting the same to a solvent vapor absorption operation.

In testimony whereof, I affix my signature.

RUDOLF OERTEL.